United States Patent
Leuthold

(10) Patent No.: US 6,502,538 B2
(45) Date of Patent: Jan. 7, 2003

(54) CAM FOR COMPOSITE CAMSHAFT

(75) Inventor: Rudolf Leuthold, Grüsch (CH)

(73) Assignee: Thyssen Krupp Automotive AG, Bochum (DE)

(*) Notice: Subject to any disclaimer, the term of this patent is extended or adjusted under 35 U.S.C. 154(b) by 0 days.

(21) Appl. No.: 09/578,417

(22) Filed: May 25, 2000

(65) Prior Publication Data

US 2002/0096014 A1 Jul. 25, 2002

(30) Foreign Application Priority Data

Jun. 1, 1999 (DE) .......................... 199 25 028

(51) Int. Cl.⁷ .................................................. F01L 1/04
(52) U.S. Cl. ..................... 123/90.6; 29/888.1; 74/567
(58) Field of Search ..................... 29/888.1; 123/90.6; 74/567; 403/13, 14, 334

(56) References Cited

U.S. PATENT DOCUMENTS

| | | | | |
|---|---|---|---|---|
| 4,798,178 A | * | 1/1989 | Greulich | 123/90.6 |
| 4,804,290 A | * | 2/1989 | Balsells | 403/326 |
| 4,826,347 A | * | 5/1989 | Baril | 403/282 |
| 5,307,708 A | * | 5/1994 | Matt | 123/90.6 |
| 5,598,631 A | * | 2/1997 | Umezawa | 29/888.1 |

* cited by examiner

Primary Examiner—Thomas Denion
Assistant Examiner—Jaime Corrigan
(74) Attorney, Agent, or Firm—Max Fogiel

(57) ABSTRACT

A cam with a bore that has a funnel-shaped core-insertion section. To ensure that the cam will rest more securely against the core and remain more precisely centered, the section (5) comprises at least two mutually aligned conical extents (6 & 7), each expanding outward at a different apical angle.

8 Claims, 2 Drawing Sheets

CAM FOR COMPOSITE CAMSHAFT

The present invention concerns the design of a cam for a composite camshaft for controlling the valves in internal-combustion engine and featuring the characteristics recited in the preamble to claim 1.

Cams and camshaft of this genus are described in German 4 121 951 C2. The core of the shaft differs in thickness along its length, and, to facilitate sliding the cam over it, the cam is provided with a cavity that tapers out like a funnel at least part-way along at least one side. The outside diameter of the opening into the cavity is at least as long as the ridges or webs that constitute the thicker sections of the core. The conical expansion extends at least ⅕ of the thickness of the cam and has an apical angle of approximately 20·.

This design has drawbacks. First, in spite of the funnel-shaped expansion, considerable force is required to mount the cams. Furthermore, it is difficult to keep the cams precisely centered on the core.

The object of the present invention is a cam with a bore that has a funnel-shaped core-insertion section ensuring that the cam will rest more securely against the core and remain more precisely centered.

This object is attained in accordance with the present invention by the characteristics recited in the body of claim 1. Advantageous further and more advance embodiments are addressed in the subsidiary claims, 2 through 8.

Figure 1:
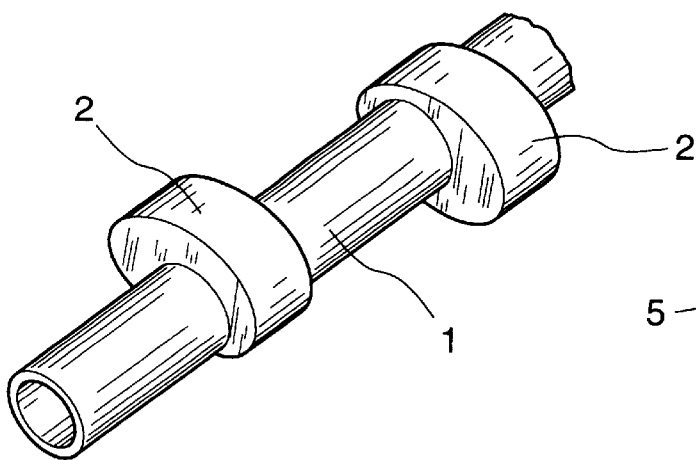
Figure 2:
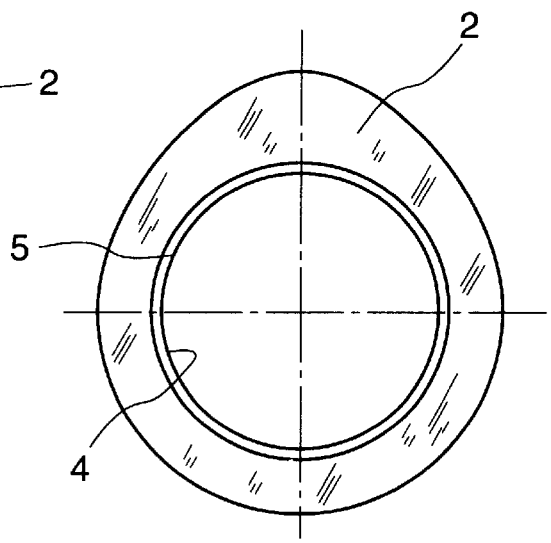
Figure 3:
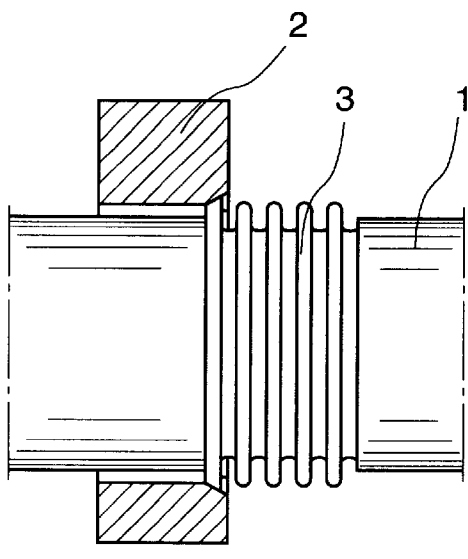
Figure 4:
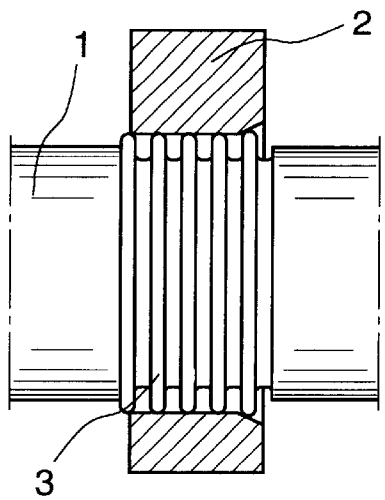
Figure 5:
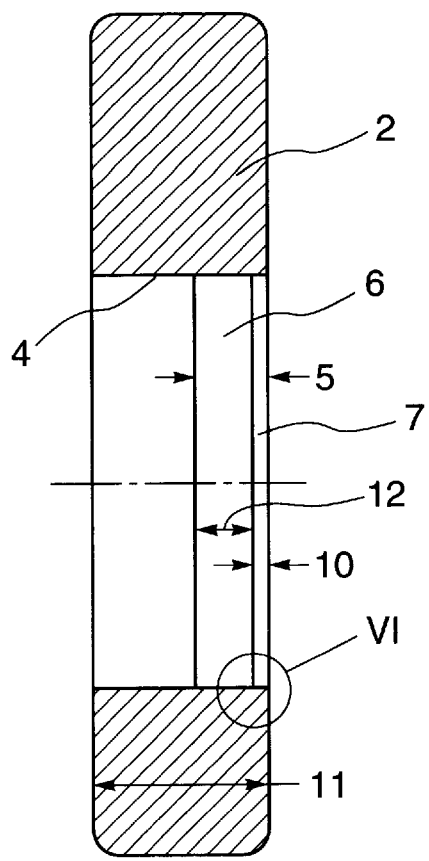
Figure 6:
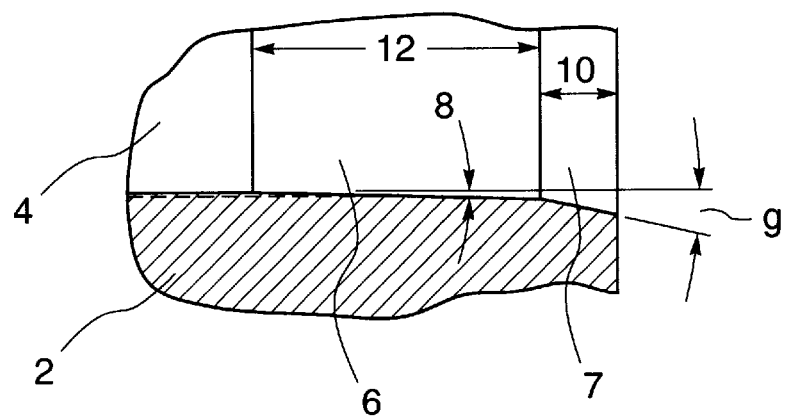

One embodiment of the present invention will now be specified by way of example with reference to the accompanying drawing, wherein FIG. 1 is a perspective view of q composite camshaft, FIG. 2 a view of a single cam, FIG. 3 illustrates a cam and a core before the core has been forced onto it, FIG. 4 illustrates the cam forced onto the core, FIG. 5 is a section through the cam, and FIG. 6 is a larger-scale depiction of the detail VI in FIG. 5.

The composite camshaft illustrated in FIGS. 1 through 4 comprises a core 1 that cams 2 can be forced onto. The shape of each cam 2 and its orientation in relation to core 1 will be dictated by the specifications of the particular internal-combustion engine. The core 1 of the illustrated embodiment is a hollow cylinder with corrugations 3 that constitute seats for cams 2. Each cam 2 is provided with a bore 4 that is essentially narrower than corrugations 3. The cam's core-insertion section 5 is funnel-shaped and at least as wide as corrugations 3. Corrugations 3 are compressed when cams 2 are forced over them, resulting in a plastic but resilient deformation that ensures a tight fit between the cams and the core. Cams 2 are, at least in the vicinity of bore 4, usually harder than core 1.

FIGS. 5 and 6 illustrate the core-insertion section 5 of a cam 2 in detail. Section 5 comprises two conical extents 6 and 7 of different length and apical angle. Apical semi-angle 8 is 2·. The apical angle of outer conical extent 7 is 20·, its semi-angle accordingly equaling 10·.

The length 10 of outer conical extent 7 is 0.09 the thickness 11 of a cam 2.

Depending on the specifications, core-insertion section 5 may comprise more than two mutually aligned conical extents. This feature can be particularly practical when cams 2 have a very considerable thickness 11.

Components 1. core
2. cam
3. corrugations
4. bore
5. core-insertion section
6. inner conical extent
7. outer conical extent
8. apical semi-angle
9. apical semi-angle
10. length of outer conical extent 7
11. thickness of a cam
12. length of inner conical extent 6

I claim:

1. A cam supporting arrangement, comprising: a core of a composite camshaft; a cam that is forced over said core and having a cylindrical round bore; a round funnel-shaped core-insertion section in said bore and having at least two mutually aligned conical extents of circular cross-section, each conical extent expanding outward at a different apical angle, said round funnel-shaped core insertion section having a wider funnel-shape round section at its entrance region; said core being a round hollow cylinder with corrugations for seating said cam securely and precisely centered, said round funnel-shaped core-insertion section being at least as wide as said corrugations, said round bore being narrower than said corrugations so that said corrugations are compressed when said cam is seated on said corrugations for producing a tight fit between said cam and said core by plastic and resilient deformation of said corrugations, said round funnel-shaped core insertion section being concentric with said round hollow cylindrical core.

2. A cam supporting arrangement as defined in claim 1, wherein said mutually aligned conical extents expand by a factor of three to five in width.

3. A cam supporting arrangement as defined in claim 1, wherein said mutually aligned conical extents expand by a factor of five in width.

4. A cam supporting arrangement as defined in claim 1, wherein said two mutually aligned conical extents comprise an inner conical extent and an outer conical extent, the apical angle of said inner conical extent being 3° to 5°, and the apical angle of the outer conical extent being 15° to 25°.

5. A cam supporting arrangement as defined in claim 1, wherein said two mutually aligned conical extents comprise an inner conical extent and an outer conical extent, the apical angle of said inner conical extent being 4° and the apical angle of the outer conical extent being 20°.

6. A cam supporting arrangement as defined in claim 1, wherein said mutually aligned conical extents are reduced from entrance to exit.

7. A cam supporting arrangement as defined in claim 1, wherein said two mutually aligned conical extents comprise an inner conical extent and an outer conical extent, said inner conical extent and the outer conical extent having a length of 0.08 to 0.12 times the thickness of the cam.

8. A cam supporting arrangement as defined in claim 1, wherein said two mutually aligned conical extents comprise an inner conical extent and an outer conical extent, said inner conical extent having a length of 1 to 3 mm and said outer conical extent having a length of 3 to 6 mm.

* * * * *